United States Patent Office 2,960,723
Patented Nov. 22, 1960

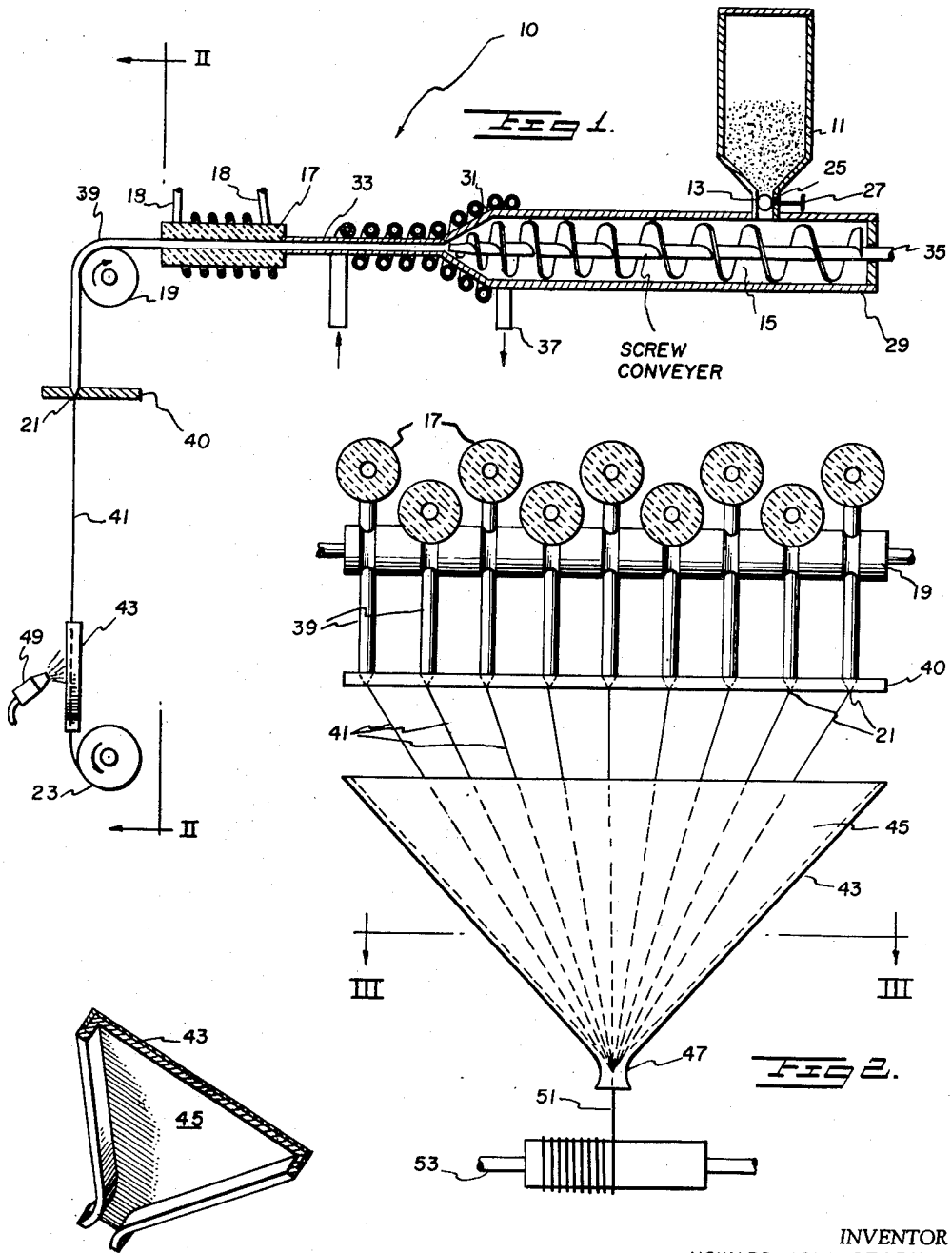

2,960,723
GLASS FIBER FORMING MACHINE

Howard John Stark, 920 N. Lebanon St., Arlington, Va.

Filed July 15, 1953, Ser. No. 368,241

2 Claims. (Cl. 18—8)

(Granted under Title 35, U.S. Code (1952), sec. 266)

The invention described herein may be manufactured or used by or for the Government of the United States of America for governmental purposes without the payment of any royalties thereon or therefor.

The present invention relates to a glass fiber forming machine and more particularly to a novel method and apparatus for forming relatively continuous threads of glass fibers by mechanical extrusion of glass or the like.

Generally, production of glass fiber has required the use of fine orifices or feeders constructed of expensive materials, such as platinum, to successfully withstand the very high temperatures and the severe chemical and physical corrosion by the molten glass. However, after a period of service, all such orifices become unsatisfactory because the fine orifices become enlarged by the constant erosion of the flowing glass. These features are undesirable from the standpoint that, besides the original high cost, the maintenance of such equipment results in a great expenditure of time and money.

In order to produce very small fibers at a rapid rate, it is necessary to have an accurate temperature control of the glass during its passage from the supply body of molten glass to the point at which said fibers are completely formed. Consequently, known methods of producing glass fiber usually utilize auxiliary heating devices to maintain the glass at a constant temperature before being formed. Therefore, the equipment necessary for forming glass fiber becomes highly expensive to install and to maintain in efficient operating condition.

In accordance with this invention, powdered or finely ground glass or powdered chemical comprising glass formulation are heated in an electrically heated ceramic sleeve to a molten state. The molten glass composition is extended through an orifice in the ceramic sleeve and pulled through a dimensional orifice to form a filament which is then sized or coated with a suitable substance, such as light petroleum oil or the like.

The present invention utilizes an economical apparatus wherein a melting furnace is eliminated and the molten glass is extruded from a heated ceramic sleeve. The apparatus does not incorporate any expensive noble metal orifices nor any auxiliary devices to maintain the glass fiber at a constant temperature after being extruded from the ceramic sleeve. Also, the ceramic sleeve is constructed of such common substance, readily obtainable and manufactured, that they can be replaced whenever the opening of the sleeve becomes enlarged by the constant erosion of the flowing glass.

By extruding the glass through the heated ceramic sleeve, the temperature of the molten glass can be easily maintained relatively high for a longer period than previously known, since the extruding pressure keeps the glass moving at a rapid rate after leaving the ceramic sleeve orifice. Further, the ceramic sleeve orifice is of a sufficiently large diameter that clogging of the glass therein would not result after an appreciable period of use and of such large diameter that rapid cooling of the glass will not occur before being finally formed by the dimensional orifice.

Therefore, the invention provides a simple unit which may utilize either powdered or finely ground new or old glass or powdered chemicals comprising glass formulations well known in the art. Consequently, glass fibers are produced at a low cost by using simple equipment and relatively cheap raw materials. Also, expensive platinum, or its alloys, are not utilized nor are extensive accessories necessary to maintain the glass at a constant temperature before being completely formed.

An object of the present invention is to provide for the economical production of glass fibers. A further object is to provide a method for the simultaneous production of a plurality of the fibers.

Another object is to provide a method and apparatus for the production of glas fibers wherein the glass is extruded through a large orifice in a ceramic sleeve.

A further object of the invention is the provision of a glass fiber forming machine utilizing new or scrap glass as the raw material.

Still another object is to provide a method which extrudes the molten glass at a rate controlled by the extruding pressures so as to maintain the temperatures of the extruded glass substantially constant until finally formed.

A final object of the present invention is the provision of a glass fiber forming machine provided wherein a sizing or coating is applied to the fibers shortly after being finally formed.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 is a side elevation, partly in section, of a preferred embodiment of the invention illustrating a single unit of the glass fiber forming machine;

Fig. 2 is a front view of a preferred embodiment of the invention showing a plurality of the glass fibers emanating from a plurality of units similar to that illustrated in Fig. 1; and Fig. 3 is a cross-section taken on lines 3—3 of Fig. 2.

Referring now to Fig. 1 of the drawings, the raw powdered or ground glass, or powdered glass producing chemicals are continuously fed from the hopper 11 through the controllable orifice 13 to a worm or screw 15 which conveys the raw material to an electrically heated ceramic sleeve 17, wherein the materials are heated to a molten state and extruded over a grooved roller 19 to a dimensional orifice 21, and finally continuously wound on a spindle 23. The speed of both the screw 15 and the roller 19, and the rate of winding of the spindle 23 determines the diameter of the finally formed glass fiber, as hereinafter described.

There is shown in Fig. 1 a preferred embodiment 10 having the hopper 11 of low corrosion and friction material such as stainless steel or the like connected to a tubular member 29 by the controllable orifice 13 having a valve 25 adjustable through a valve handle 27.

The tubular member 29 is formed with a tapering forward end 31 provided with a conduit 33, wherein said members 29 and 33 are formed from highly polished metal, such as stainless steel or the like, to thereby offer as little resistance as possible to the flow of raw materials therethrough. The screw 15 is mounted within tubular member 29 by means of a shaft 35 being driven by a suitable power source.

The conduit 33 and the tapered portion 31 of member 29, have a cooling coil 37, wrapped about a substantial portion thereof, through which cooling water is circulated to prevent heating of the raw material within said conduit 33 and the tubular member 29. Secured to the end of the conduit 33 by suitable attaching means, is the electrically heated sleeve 17 of ceramic or the like.

The ceramic sleeve 17 is provided at its opposite ends with electrical resistance element 18 through which an adjustable current is applied to heat the sleeve 17 to the fusion temperature of the raw powdered material. The material is thereby reduced to a fluid, plastic rod 39 of molten glass which continually moves through sleeve 17. Hence the molten glass produced within the sleeve 17 will be continually extruded therefrom by the ram pressure exerted on it by the raw material continuously being moved toward the ceramic sleeve by the worm or screw 15. The raw material is reduced to molten glass only within the heated sleeve 17, thereby eliminating the need of any special furnace for heating the raw material. Accordingly, it can be seen that the raw material is reduced to a molten state by the utilization of a simple apparatus without the necessity of noble metals being used.

The hot plastic rod of glass 39 extruded through the sleeve 17 is picked up by the roller 19, which has formed on its surface circular grooves with corresponding ridges at the edges thereof. The roller 19 may be formed from any suitable material, such as steel, capable of withstanding the high temperatures of the glass extruded from the sleeve 17, and is powered by any suitable means, such as the power unit driving the screw 15. The roller 19 is turned clockwise, as shown in Fig. 1, in a reverse direction to the flow of the glass rod 39, to thereby control the speed with which the glass rod 39 is transformed to fiber. The speed of roller 19 is variable and acts to control the apparatus in handling glass compositions in which the viscosity and drawing temperatures may be variable and which by other processes cannot be converted readily into fibers. The speed-up in applicant's process resulting from the new organization of elements, requires that roller 19 serve as the brake in the drawing of the fibers. After flowing over the roller 19, the glass rod 39 contacts the dimensional orifice 21, which may be formed in a plate 40 of metal or the like. The glass rod 39 passes through the dimensional orifice 21 to finally form a filament of glass 41, of a size determined by said orifice 21 which is cooled quickly by the atmosphere. The finally formed filament 41 is then passed through a suitably sizing means such as a suitably mounted pad 43 having a surface 45 of absorbent material, such as wool, cotton or the like, contacting the filament 41. Facing the surface 45 is a suitably mounted spray 49 directing its spray on the surface 45, to saturate the absorbent surface 45 with a sizing spray, such as light petroleum oil or the like, to heal the fissures and discontinuities that may exist on the filament 41. The sizing impregnates the fissures and discontinuities to permit the reduction of stress concentrations resulting therefrom. Further, the sizing functions to protect each filament 41, so that a thread formed from a plurality of such filaments will not tend to seize and scratch each other as they normally would if not coated.

The pad 43 is formed at its lower end with a guide 47 to gather a plurality of filaments 41 to form a single thread 51. A wind-up spindle 23 is provided to mechanically draw the fibers and wind-up the thread 51 as it is being formed. Since the spindle 23 is small, approximately 3 to 4 inches in length in the preferred embodiment, there is no need for any of the well-known mechanisms to uniformly wind the thread 51 over the spindle 23. The spindle 23 serves as a pulling means for the filaments 41 and is synchronized with the extruding pressure in sleeve 17 and with the roller 19 to aid in controlling the diameter of the filament 41, which is a function of the viscosity of the glass and the rate of drawing.

In the operation of a single unit 10 of the preferred embodiment, the hopper or reservoir 11 is filled with the raw powdered glass or powdered glass producing chemicals and not with the usually expensive glass marbles or cullet. The controllable orifice 13 is adjusted by manipulating the handle 27 to a specific opening determined by the speed of the screw 15. The screw 15 conveys the raw material through to the conduit 33 and into the electrically heated ceramic sleeve 17, wherein material is reduced to a plastic rod of molten glass 39. Since the raw material is being continuously pushed forward by the screw 15, the molten glass within sleeve 17 is continuously extruded from said sleeve. Also, the cooling coils 37 prevent any of the heat produced by the electrical heated sleeve 17 from reacting with or effecting the raw material within the conduit 33 or the tube 29. Thusly, eliminating the necessity of having a large ceramic furnace for melting the raw material or for a special type of raw material especially suitable for such ceramic furnace.

On first starting the unit 10 in operation, the hot plastic rod 39 extruded through the sleeve 17 can be pulled with a pair of tongs or pliers so that the initial glass rod can be pulled forward and over the grooved roller 19. The plastic glass rod 39 will be guided over the roller 19 by the grooves thereon and drop therefrom into the aligned dimensional orifice 21 in plate 40. The glass rod 39 has a fairly large cross-sectional area which functions to maintain its high temperature fairly constant from the period it leaves the sleeve 17 until it passes through the dimensional orifice 21. Also, the grooved roller 19, since turning in a clock-wise or reverse direction than the flow of the glass rod 39, will act to control the speed with which the plastic glass rod is moving. The grooved roller is a variable speed roller and thereby capable of being manually controlled to determine the proper speed at which the hot plastic rod travels from the ceramic sleeve 17 to the dimensional orifice 21.

Since the electrically heated sleeve 17 extrudes a fairly large hot plastic rod 39 and not the finally formed filament itself, the dimensional orifice 21 is utilized to finally size the hot plastic rod to its desired cross-sectional dimension. After being drawn through the orifice 21, the glass filament has reached the point where it is rapidly being cooled and solidified.

The filament 41 drawn from the dimensional orifice 21 is brought into contact with the pad 43 having its surface 45 coated with an absorbent substance. The absorbent substance is continuously dampened with a sizing or coating material, such as light petroleum oil, by the spray 49 to thereby coat the individual filaments 41 as they travel across the surface 45 toward the duct 47. The duct or guide 47, at the lower extremity of the member 43, serves to gather together the plurality of filaments 41 into a single thread 51, which is continuously pulled and wound about the spindle 23.

The speed of the spindle 23 bears a direct relationship to the speed of both the screw 15 and the groove roller 19. The speed of the grooved roller 19 will maintain the flow of the hot plastic glass rod 39 at such a speed that the filament 41, being drawn and pulled by spindle 23, will be of a predetermined cross-sectional dimension. In addition, the grooved roller 19 functions to prevent the hot plastic glass rod 39 from flowing too fast in order to maintain a continuous flow through the dimensional orifice 21. The grooved roller 19 also bears a direct relationship to the speed of the screw 15, so that the roller 19 will not retard the flow of the hot plastic glass rod 39 and is adjusted so as to cause the rod 39 to flow toward the dimensional orifice 21 at a rate corresponding to the speed at which the screw 15 is pushing the raw material forward.

Although only one extruding unit 10 is illustrated in Fig. 1, it is to be understood that a plurality of such units will be utilized, as indicated from the showing in Fig. 2, installed in either a horizontal relationship, vertical or in any other desirable pattern deemed necessary by the particular installation intended. Fig. 2 shows a plurality of the units in a staggered horizontal relationship, to thereby utilize a minimum of space in forming a plurality of glass filaments.

In the commercial operation of the unit 10, 50 to 150 units, as that shown in Fig. 1, are operated at one time. Also, the various filaments extruded from each unit 10 does not have to be gathered and drawn into a single thread 51, as shown in Fig. 2. The individual filaments 41 may be drawn or wound on individual juxtaposed spindles positioned on the shaft 53. Thusly, the shaft 53 will have mounted thereon a plurality of wind-up spindles to gather the individual filaments; in such cases, the pad 45, sprayed with the sizing or coating material, will be large enough to accommodate all of the filaments 41.

In this manner, the glass filaments wound on individual spindles would make a yarn suitable for twisting and used in weaving into fabric or conversion into mat for reinforcement in plastics.

In accordance with the present invention, the method and apparatus embodies the simultaneous production of a plurality of glass filaments by an economical and simple unit without the use of expensive platinum orifices, without the usual difficulty of maintaining an effective temperature control and without the necessity of a large ceramic furnace for producing molten glass. Accordingly, glass fiber is produced at a low cost using simple equipment and cheap raw materials.

While only simple embodiments of the present invention have been illustrated and described herein, it will be obvious to those skilled in the art that many changes and modifications of the invention may be made without departing from the spirit thereof, and it is intended to protect all such modifications as fall within the scope of the appended claims.

I claim:

1. Apparatus for forming substantially continuous glass fibers from raw glass formulating materials, which comprises a hopper adapted to hold the raw materials, a conveyor connected to the hopper for receiving the raw materials therefrom, a confined heating and extruding sleeve connected to the conveyor for receiving materials therefrom, means for heating the sleeve to fusion temperature of the materials to thereby reduce the raw materials into a molten glass rod, a grooved roller positioned adjacent the sleeve for controlling the flow of molten glass rod therefrom, means forming a reducing orifice for receiving molten glass rod from the roller, and means for drawing the molten glass rod through the reducing orifice as a continuous glass fiber.

2. Apparatus for forming substantially continuous glass fibers from granulated glass, which comprises, a screw conveyor, means for feeding granulated glass to the screw conveyor at a predetermined rate, a heating and extruding sleeve connected to the screw conveyor in a manner as to receive at one end thereof a confined stream of granulated glass from the conveyor and to extrude a rod of molten glass from an opposite end thereof, means for heating the sleeve to the fusion temperature of the granulated glass to thereby reduce the stream of granulated glass to a rod of molten glass of predetermined cross-section, a grooved roller positioned adjacent the outlet end of the sleeve to receive and retard movement of the molten glass rod, means forming a reducing orifice for receiving the molten glass rod from the roller, and means for drawing the molten glass rod through the reducing orifice to thereby reduce its cross-section to a fine glass filament.

References Cited in the file of this patent

UNITED STATES PATENTS

| | | |
|---|---|---|
| 946,179 | Weiskopf | Jan. 11, 1910 |
| 2,229,489 | Barnard | Jan. 21, 1941 |
| 2,255,236 | Willis | Sept. 9, 1941 |
| 2,392,805 | Biefeld | Jan. 15, 1946 |
| 2,566,252 | Tooley et al. | Aug. 28, 1951 |
| 2,585,496 | Powell | Feb. 12, 1952 |
| 2,621,444 | Schuller | Dec. 16, 1952 |